United States Patent
Harper et al.

(10) Patent No.: US 10,563,594 B2
(45) Date of Patent: Feb. 18, 2020

(54) SYSTEMS AND METHODS FOR PREDICTING FUEL CIRCUIT LEAKS

(71) Applicant: General Electric Company, Schenectady, NY (US)

(72) Inventors: James Harper, Greenville, SC (US); Akilez Krishnamurthy Arthanari, Hyderabad (IN)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 15/295,559

(22) Filed: Oct. 17, 2016

(65) Prior Publication Data
US 2018/0106197 A1    Apr. 19, 2018

(51) Int. Cl.
F02C 9/26    (2006.01)
F02C 9/28    (2006.01)

(52) U.S. Cl.
CPC ............ *F02C 9/263* (2013.01); *F02C 9/26* (2013.01); *F02C 9/28* (2013.01); *F05D 2260/80* (2013.01); *F05D 2260/821* (2013.01); *F05D 2270/09* (2013.01); *F23N 2031/18* (2013.01)

(58) Field of Classification Search
CPC .... F02C 9/26; F02C 9/263; F02C 9/28; F05D 2260/80; F05D 2260/821; F23N 2031/18
See application file for complete search history.

(56) References Cited

U.S. PATENT DOCUMENTS

| | | | |
|---|---|---|---|
| 6,766,269 B2 | 7/2004 | Lee | |
| 7,963,156 B2 | 6/2011 | Boerkel | |
| 8,015,791 B2 | 9/2011 | Finkbeiner | |
| 8,185,293 B2 | 5/2012 | Jiang et al. | |
| 2011/0100096 A1* | 5/2011 | Szepek | G01M 3/2876 73/40.5 R |
| 2012/0102914 A1 | 5/2012 | Kirzhner et al. | |
| 2013/0269364 A1* | 10/2013 | Romig | F02C 7/232 60/779 |
| 2014/0102179 A1* | 4/2014 | Ekanayake | F02C 7/00 73/40.5 R |
| 2015/0000300 A1* | 1/2015 | Zhang | F02C 9/32 60/776 |
| 2015/0027100 A1* | 1/2015 | Qin | F02O 7/228 60/39.091 |
| 2017/0321608 A1* | 11/2017 | Crowley | F02C 7/222 |

* cited by examiner

*Primary Examiner* — Steven M Sutherland
(74) *Attorney, Agent, or Firm* — Fletcher Yoder, P.C.

(57) ABSTRACT

A system includes a combustor assembly which receives a fuel-oxidant mixture. The system includes a control valve which controls a fuel flow into the combustor assembly. The system includes one or more sensors which measure one or more properties. The system includes a controller communicatively coupled to the one or more sensors and the control valve. The controller receives data from the one or more sensors indicative of operating conditions of the combustor assembly. The controller determines a predicted fuel flow for a first fuel line of a plurality of fuel lines based in part on the data received from the one or more sensors. The controller calculates a difference between a commanded fuel flow and the predicted fuel flow. The controller adjusts an operation of the control valve associated with a gas turbine engine when the difference is greater than a threshold.

20 Claims, 3 Drawing Sheets

SYSTEMS AND METHODS FOR PREDICTING FUEL CIRCUIT LEAKS

BACKGROUND

The subject matter disclosed herein relates to gas turbine engines. More particularly, the present disclosure relates to systems and methods for detecting fuel leaks based on fuel composition changes in gas turbine engines.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a combustor assembly which receives a fuel-oxidant mixture. The system includes a control valve which controls a fuel flow into the combustor assembly. The system includes one or more sensors which measure one or more properties. The system includes a controller communicatively coupled to the one or more sensors and the control valve. The controller receives data from the one or more sensors indicative of operating conditions of the combustor assembly. The controller determines a predicted fuel flow for a first fuel line of a plurality of fuel lines based in part on the data received from the one or more sensors. The controller calculates a difference between a commanded fuel flow and the predicted fuel flow. The controller adjusts an operation of the control valve associated with a gas turbine engine when the difference is greater than a threshold.

In a second embodiment, a method includes receiving, via a controller, data from one or more sensors configured to measure one or more properties of a combustor fuel input from a plurality of fuel lines. The method includes determining a predicted fuel flow for a fuel based in part on the data received from the one or more sensors. The method includes calculating a difference between a commanded fuel flow and the predicted fuel flow. The method includes adjusting operation of a gas turbine engine when the difference is greater than a threshold.

In a third embodiment, a tangible, non-transitory computer-readable media storing computer instructions thereon, the computer instructions, when executed by a processor receive data from one or more sensors configured to measure one or more properties of a combustor fuel input from a plurality of fuel lines. The computer instructions, when executed by a processor determine a predicted fuel flow of a fuel based in part on the data received from the one or more sensors. The computer instructions, when executed by a processor calculate a difference between a commanded fuel flow and the predicted fuel flow. The computer instructions, when executed by a processor adjust operation of a gas turbine engine when the difference is greater than a threshold.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
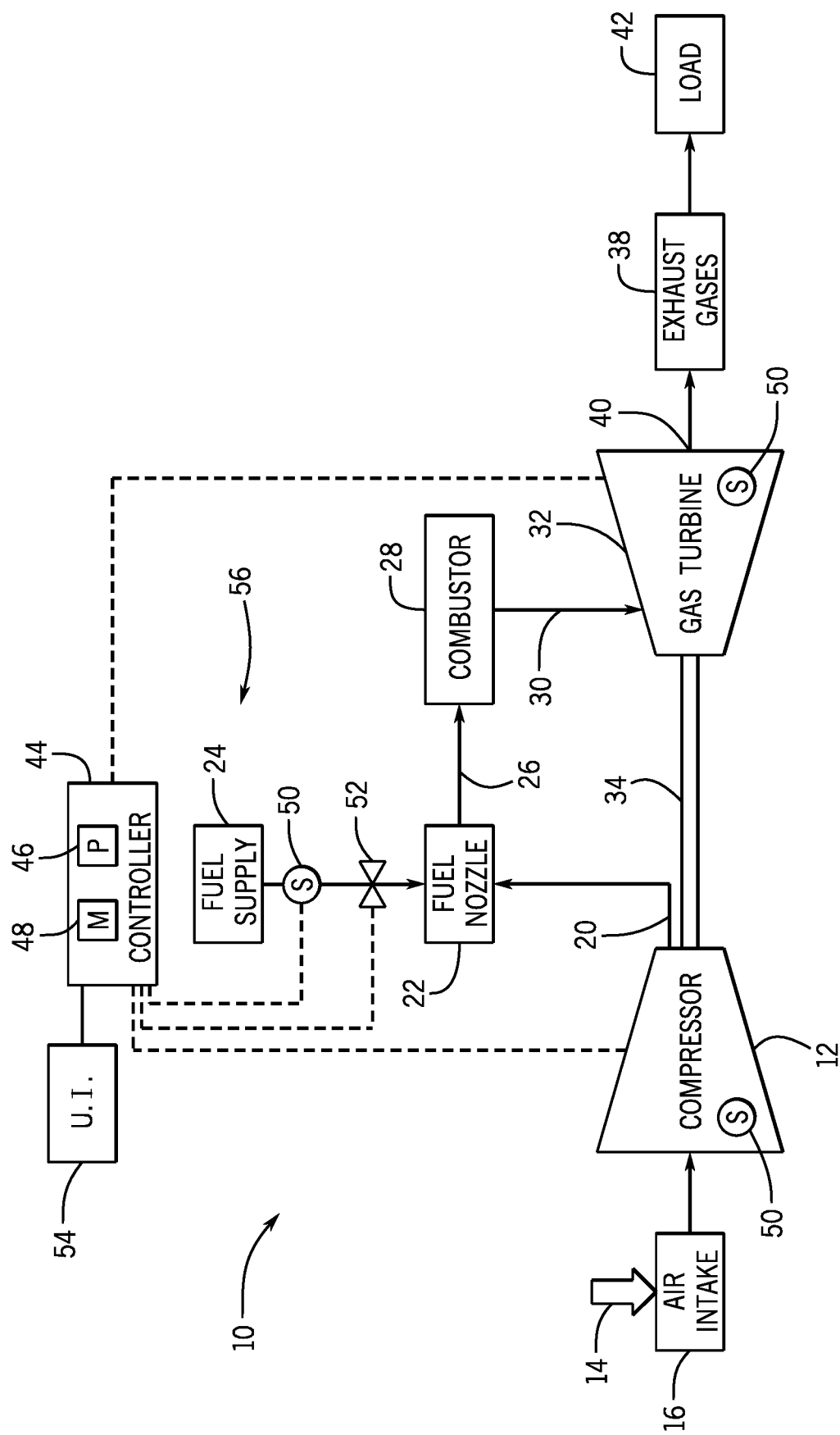
FIG. 1 is a block diagram of an embodiment of a gas turbine system.

One or more specific embodiments of the claimed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward systems and methods for detecting leaks in gas turbine engine systems. In gas turbine engines, fuel leaks may occur in internal components of the gas turbine machine. For instance, fuel leaks may occur in fuel lines that provide fuel to a combustor assembly, such as through a flexible hose, through a connector, or otherwise. The leaked fuel may affect instrumentation, hardware, or other components of the gas turbine engine system. Moreover, if leaks are not detected, the leaked fuel may accumulate within the gas turbine. The accumulation of leaked fuel may contribute to ignition of an oxidant-fuel mixture outside of the combustor or premature ignition of the oxidant-fuel mixture.

The embodiments disclosed herein improve upon conventional leak detection systems and methods. Conventional leak detection systems include hazardous gas detection systems, gas control valve detection systems, and gas chromatography. Hazardous gas detection systems may be less reliable compared to other conventional systems because they may often trigger false alarms. Gas control valve detection systems may detect a change in valve location to correlate to fuel composition. However, conventional gas control valve detection systems have not provided a level of accuracy desired in detecting fuel leaks. Gas chromatography may be more reliable for determining the presence of fuel leaks compared to gas control valve detection systems and hazardous gas detection systems. However, the equipment associated with gas chromatography is often cost prohibitive. Moreover, analyzing fuel composition via gas chromatography can be time consuming.

The embodiments disclosed herein seek to overcome the inefficiencies of the conventional leak detection systems described above by providing a cost-effective and efficient fuel leak detection system. Advantageously, the embodiments disclosed herein may be applied to detect leaks for many different types of fuels with various constituents. In certain embodiments, the leak detection system disclosed herein may be used to measure pressure of various fuel lines. The fuel lines may share a common header which may provide the fuel supply. Each of the fuel lines and the common header may contain a control valve and one or more sensors. The control valves and the sensors may be communicatively coupled to a controller. The controller may be associated with the leak detection system and may receive data from the sensors indicative of gas turbine cycle conditions, fuel temperature, fuel pressure in a fuel line, oxidant composition, oxidant temperature, and the line. The controller may predict fuel flow based on the data received from the sensors and compares the predicted fuel flow to a commanded fuel flow.

The controller may calculate a difference between the commanded fuel flow and the predicted fuel flow for each fuel line. If the fuel composition changes, the controller may detect a change in pressure in each fuel line via data acquired by the pressure sensor. If the calculated fuel flow due to a pressure measurement in a single fuel line does not deviate from its commanded fuel flow and exceeds the threshold, while the other fuel lines remains relatively unchanged, the controller may determine that a fuel leak may be present. In one embodiment, the flow difference between a calculated and commanded flow and/or pressure change in a given fuel line may be compared to a threshold, which corresponds to an acceptable tolerance between a difference between a commanded fuel flow and a predicted fuel flow for a given fuel line. The threshold is determined based on several factors, including but not limited to, a fuel conduit (e.g., diameter, geometry) and pressure ratios of the fuel line to the back pressure of the combustor.

If the calculated fuel flow due to a pressure measurement in a single fuel line deviates from its commanded fuel flow and exceeds the threshold, while the other fuel lines do not, the controller may detect a fuel leak in the fuel line. If a fuel leak may be present (e.g., a plurality of fuel line calculated flow rates deviate from their commanded flow rates), the controller may apply a fuel flow change compensation factor (e.g., a multiplier factor) to the fuel line(s). Afterwards, the controller may calculate the fuel flow and/or pressure change for each fuel line again. If the calculated fuel flow and/or pressure change in any of the fuel lines still varies from the other fuel lines and exceeds the threshold, the controller may confirm that a leak is present and at least one correction action may be applied. The correction action may include generating a notice or alarm, modifying one or more fuel circuit splits, modifying one or more operating conditions, shutting down one or more fuel circuits, or shutting down the machine.

If the pressure changes in each of the fuel lines vary by a similar amount (e.g., if the fuel flow calculations in each circuit vary from their commanded fuel flows), the pressure change in the fuel lines may be due to a change in fuel composition. In this situation, the controller may adjust operation of a control valve (e.g., to increase or decrease fuel flow) associated with a given fuel line in response to the change in fuel composition. Additionally, the fuel flow change compensation factors can be used in leak detection analysis (e.g., data associated with the pressure change in the fuel lines can be used in leak detection calculations), thereby reducing false leak alarms due to fuel composition change.

Turning now to the drawings, FIG. 1 is a block diagram of an embodiment of a gas turbine system 10. A compressor 12 intakes ambient air 14 to the gas turbine system 10 via an air intake 16. The ambient air 14 is taken in by the air intake 16 into the gas turbine system 10 via a suitable mechanism, such as a cold air intake, for subsequent entry of an inlet air into the compressor 12. The compressor 12 compresses the inlet air, forming pressurized air 20 by rotating blades within the compressor 12. When the compressor 12 compresses the inlet air, the compressor 12 adds energy to the inlet air thereby increasing the pressure and the temperature such that the pressurized air 20 is warmer and at a higher pressure than the ambient air 14. The pressurized air 20 may be discharged into one or more fuel nozzles 22, which mix the pressurized air 20 and a fuel 24 (e.g., a liquid fuel and/or gas fuel, such as natural gas) to produce an air-fuel mixture 26 suitable for combustion. Although the illustrated embodiment depicts air 14, the intake gas may include air, oxygen, oxygen-enriched air, oxygen-reduced air, exhaust recirculation gas (EGR), or any combination thereof. Nevertheless, the following discussion refers to air as a non-limiting example. The fuel 24 supplied to the system 10 may include gases (e.g., natural gas, LNG, LPG, refinery gas, coal gas, hydrogen gas), liquids (e.g., diesel, kerosene, naptha, ethanol, methanol, crude oils), or any other suitable fuel source.

As depicted, the pressurized air 20 enters a fuel nozzle 22 and mixes with fuel 24. The fuel nozzle 22 directs the air-fuel mixture 26 into a combustor 28. The combustor 28 ignites and combusts the air-fuel mixture 26, to form combustion products 30. The combustion products 30 are directed to a gas turbine 32, where the combustion products 30 expand and drive blades of the gas turbine 32 about a shaft 34. The gas turbine 32 is connected to the compressor 12 by the common shaft 34. Compressor vanes or blades are included as components of the compressor 12. Blades within the compressor 12 are coupled to the shaft 34, which is driven by the gas turbine 32. The shaft 34 is coupled to several components (e.g., compressor 12, gas turbine 32 throughout the gas turbine system 10). Eventually, the combustion products 30 exit the gas turbine 32 as exhaust gases 38, which then exit the gas turbine system 10 via an exhaust outlet 40. As will be appreciated, the exhaust gases 38 may be utilized to drive a load 42. The load 42 may include an electrical generator, a pump, other shaft driven equipment, and so forth.

As discussed herein, the fuel supply 24 disposed upstream from the combustor 28 can utilize various fuel sources to generate the combustion products 30 that are expanded in the gas turbine 32. The controller 44 may receive operator input from a user through a user interface 54 to adjust gas turbine cycle operating conditions, adjust fuel flow rates, and so forth. The controller 44 includes processing circuitry (e.g., processor 46) and memory circuitry (e.g., memory 48). The processor 46 may execute instructions to carry out the operation of the system 10. Sensors 50 may be disposed throughout the gas turbine system 10 and may collect data to be sent to the controller 44. For example, sensors 50 may be coupled to or upstream of the combustor 28 and may measure the temperature, flow rates, pressures, and other parameters of the fuel supply 24 and various gas turbine cycle operating conditions. Other sensors 50 may collect data from the gas turbine 32 or other components of the gas turbine system 10.

The controller 44 may also be communicatively coupled to the compressor 12, the fuel supply 24, the gas turbine 32, and/or the control valves 52. The controller 44 may use data received from the one or more sensors 50 to measure one or more properties of the combustor fuel input, as described in detail below. The controller 44, when communicatively coupled to various components of the gas turbine system 10 (e.g., the control valve 52), may function as a leak detection system 56. The components of the leak detection system 56 may be further understood with reference to FIG. 2.

Figure 2:
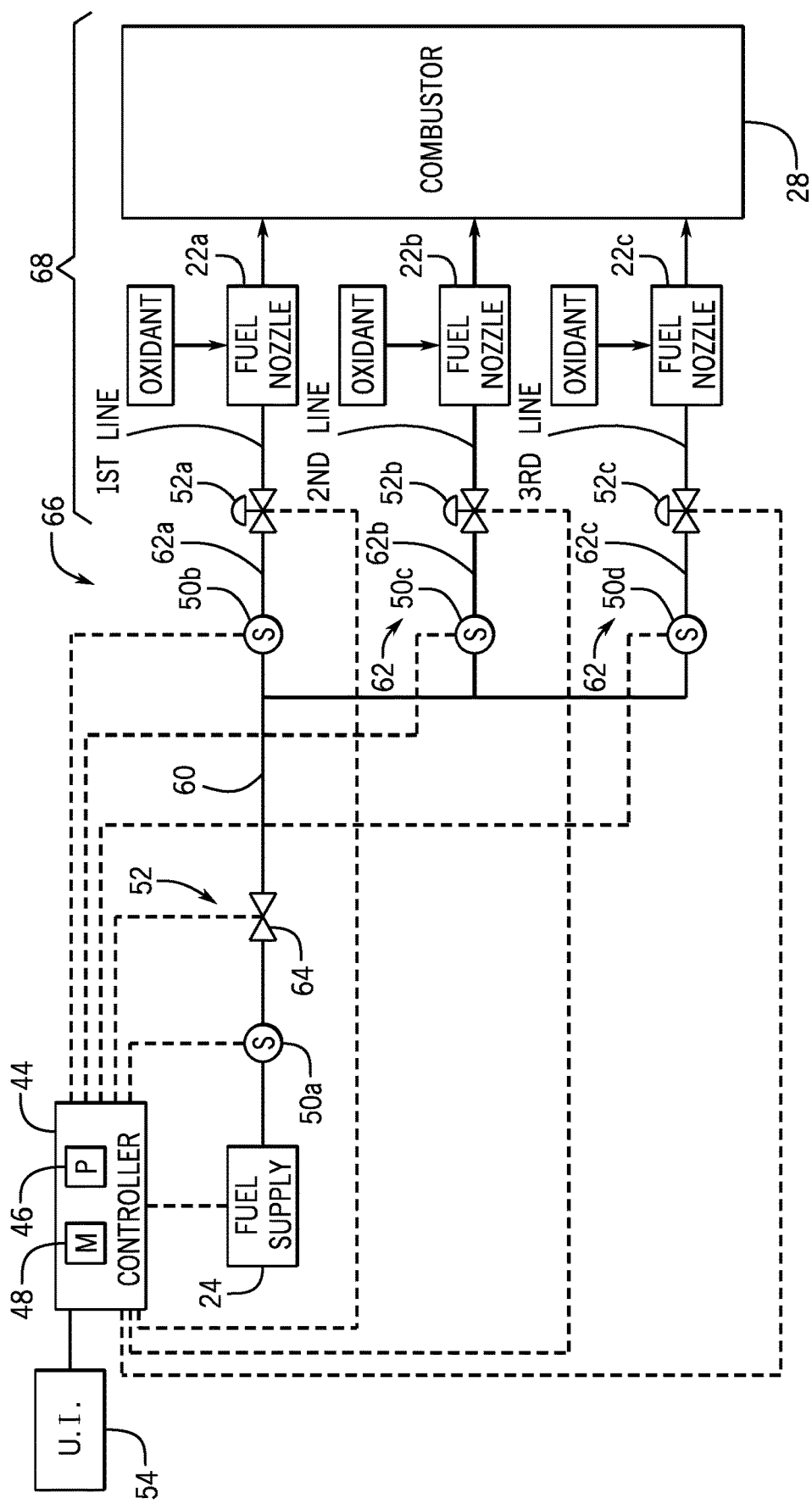
FIG. 2 is a block diagram of an embodiment of a fuel source and a plurality of fuel lines configured to flow fuel into a combustor of the gas turbine system.

FIG. 2 is a block diagram of an embodiment of the gas turbine system 10 depicting the fuel source and a plurality of fuel lines configured to feed fuel 24 into the combustor 28. The fuel supply 24 flows through a common header 60 in a fuel circuit 66 before the fuel supply 24 is separated into separate fuel lines 62 (e.g., fuel circuit splits). In one embodiment, the controller 44 may receive data from one or more sensors 50*a* disposed along the common header 60. The sensors 50*a* disposed along the common header may collect data such as upstream pressure, fuel temperature, and other fuel parameters. The controller 44 may use the data received from the sensors 50*a*, along with other data, to evaluate pressure changes in the fuel lines as explained in detail below.

In the illustrated embodiment, a header control valve 64 may control the flow of fuel 24 through the common header 60. The header control valve 64 may be communicatively coupled to the controller 44. The header control valve 64 may be adjusted to reduce or increase fuel flow to one or more fuel lines. In a non-limiting example, the common header 60 may split into a first fuel line 62*a*, a second fuel line 62*b*, and a third fuel line 62*c* (e.g., a first fuel circuit split, a second fuel circuit split, and a third fuel circuit split). Though the fuel circuit 66 is depicted as having three fuel lines, it is to be understood that the number of fuel lines may be any suitable number of fuel lines. In some situations, the fuel lines 62*a*, 62*b*, 62*c* may leak fuel 24 in a transition area 68 (e.g., an area where the fuel lines flow fuel into the combustor 28). The leaked fuel 24 may contribute to fluctuation in fuel flow to the fuel nozzle 22 and/or the combustor 28. The leaked fuel 24 may contribute to a change in pressure in the fuel lines 62*a*, 62*b*, 62*c* thereby affecting the fuel flow. Each of the fuel lines 62*a*, 62*b*, 62*c* has an associated control valve 52*a*, 52*b*, 52*c* disposed upstream of the fuel nozzle 22*a*, 22*b*, 22*c* of the respective fuel lines. As described in detail below, the fuel flow through each of the fuel lines 62*a*, 62*b*, 62*c* may be controlled based at least in part on data collected from sensors 50.

In certain embodiments, the controller 44 may be communicatively coupled to various components (e.g., sensors 50, control valves 52, header control valve 64) of the leak detection system 56. The memory 48 may store program instructions that are loadable and executable on the processor(s) 46, as well as data generated during the execution of these programs. Depending on the configuration and type of the controller 44, the memory 48 may be volatile (such as random access memory (RAM)) and/or non-volatile (such as read-only memory (ROM), flash memory, etc.). The computing device or server may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 48 may include multiple different types of memory, such as static random access memory (SRAM), dynamic random access memory (DRAM), or ROM.

The memory 48, removable storage, and non-removable storage are all examples of computer-readable storage media. For example, computer-readable storage media may include volatile and non-volatile, removable and non-removable media implemented in any method or technology for storage of information, such as computer-readable instructions, data structures, program modules, or other data. The memory 48, removable storage, and non-removable storage are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tape, magnetic disk storage or other magnetic storage devices, or any other medium which can be used to store the desired information and which can be accessed by the server or other computing device. Combinations of any of above should also be included within the scope of computer-readable media.

Returning to the discussion of the leak detection system 56, the sensors 50*b*, 50*c*, and 50*d* may provide data regarding the associated the fuel lines 62*a*, 62*b*, and 62*c*, respectively. For example, the data output by the sensors 50*b*, 50*c*, and 50*d* may provide fuel pressure, fuel temperature, other fuel parameters, oxidant composition, oxidant temperature, and other data to the controller 44. The fuel data sent to the controller 44 may predict fuel flow for the fuel lines 62*a*, 62*b*, 62*c* based in part on the data received from the one or more sensors 50*a*, 50*b*, 50*c*, 50*d*. For example, the data sent to the controller 44 may use compressible flow calculations to predict fuel flow in the fuel lines 62*a*, 62*b*, 62*c*. The controller 44 may then calculate a difference between the commanded fuel flow and the predicted fuel flow for each fuel line 62*a*, 62*b*, 62*c*. It may be appreciated that the commanded fuel flow may vary based in part on the size of the fuel line, the pressure of the fuel in the fuel line, and/or the flow or composition of the fuel. The commanded fuel flow may be defined as the desired fuel flow to flow through the common header 60 into each of the fuel lines 62*a*, 62*b*, 62*c*.

If the calculated fuel flow due to a pressure measurement in a single fuel line (e.g., fuel line 62*a*) does not deviate from its commanded fuel flow and exceeds the threshold while the other fuel lines (e.g., fuel lines 62*b*, 62*c*) do not, the controller may detect a fuel leak in the fuel line. The threshold may be understood to be an acceptable tolerance of measured conditions of the initial fuel flow and the measured conditions of the commanded fuel flow. If a fuel leak may be present, a fuel flow change compensation factor (e.g., a multiplier factor) may be applied to the fuel lines (e.g., to adjust a calculated fuel split). The pressure change for each fuel line is then calculated again. If the pressure change in the affected fuel line (e.g., fuel line 62*a*) still varies from the other fuel lines (e.g., fuel lines 62*b*, 62*c*) and exceeds the threshold, the leak is confirmed and at least one correction action may be applied. The correction action may generating a notice or alarm, modifying one or more fuel circuit splits, modifying one or more operating conditions, shutting down one or more fuel circuits, or shutting down the machine. If the pressure change of the affected fuel line (e.g., fuel line 62*a*) does not vary from the other lines (e.g., fuel lines 62*b*, 62*c*) and is within the threshold, no leak is present in the affected fuel line (e.g., fuel line 62).

If no leak is detected, the controller 44 may adjust operation of one or more of the control valves 52*a*, 52*b*, 52*c* (e.g., to increase or decrease fuel flow) associated with the fuel lines 62*a*, 62*b*, 62*c* in response to the change in fuel composition. Data associated with the pressure change in the fuel lines can be used in leak detection calculations, thereby reducing false leak alarms. Detecting a leak in the fuel lines in accordance with the disclosed embodiments may be less expensive and faster compared to other techniques used to detect leaks. The disclosed embodiments present the added benefit of being compatible with many different fuel sources with various constituents.

Figure 3:
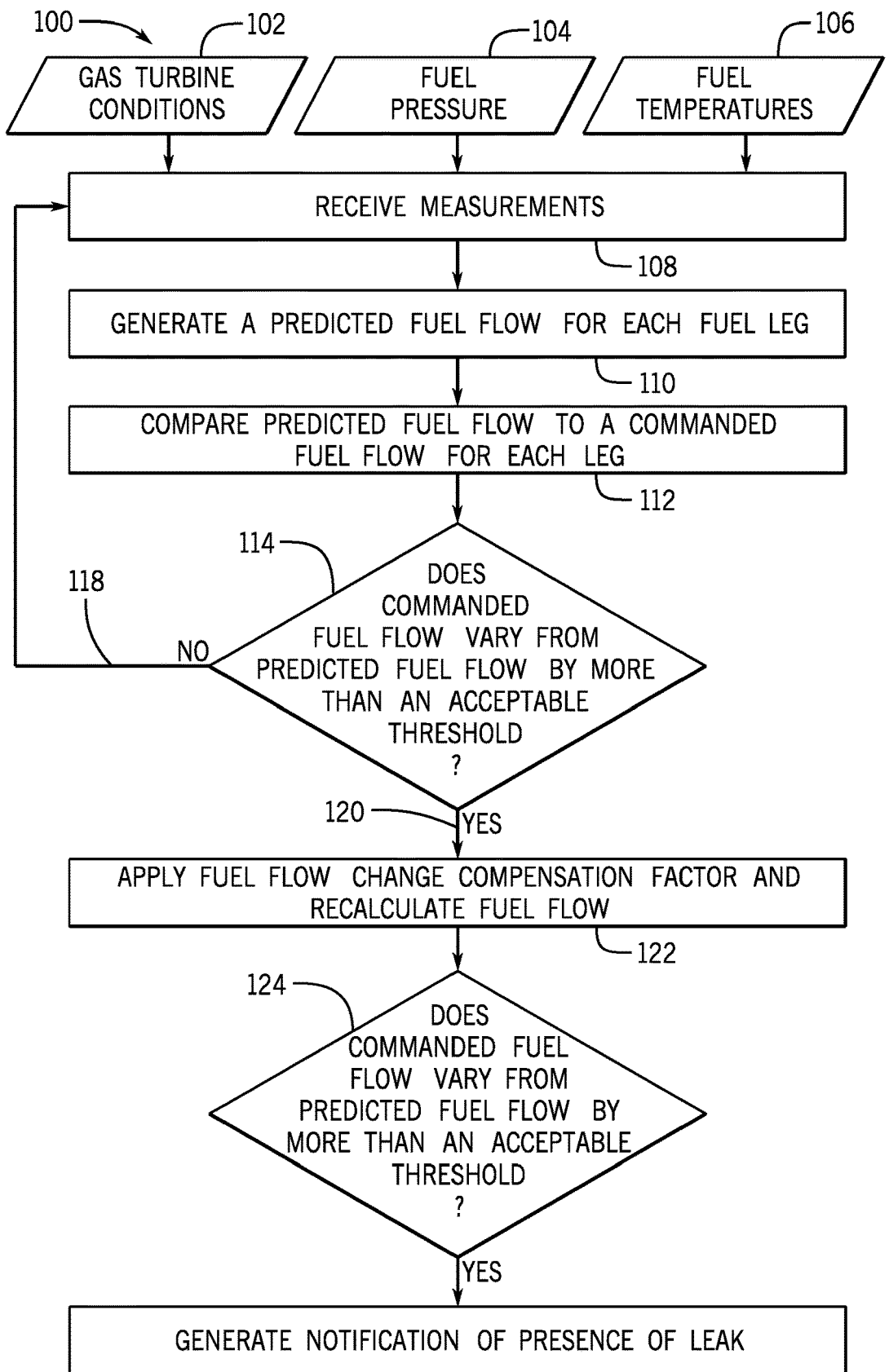
FIG. 3 is a flow diagram of an example method for detecting a fuel leak in the gas turbine system, according to an embodiment.

FIG. 3 is a flow diagram illustrating details of an example method 100 for detecting a fuel leak in the gas turbine system 10, according to an embodiment. In one example, the controller 44, alone or in combination, may perform the described operation of the method 100. In this particular implantation, the controller 44 may begin by sending data or measurements associated with the gas turbine system 10. For example, the data or measurements may include gas turbine conditions (block 102), fuel pressure (block 104), and fuel temperature (block 106). The controller 44 may receive (block 108) measurements associated with the gas turbine system 10. The controller 44 may generate (block 110) a predicted fuel flow for each fuel line. The controller 44 may compare (block 112) the predicted fuel flow for each fuel line to a commanded fuel line for the same fuel line and the pressure difference for each fuel line. The controller 44 then determines (block 114) if the predicted fuel flow and the commanded fuel flow vary by more than an acceptable threshold. If the difference between the commanded fuel flow and the predicted fuel flow is within a threshold and pressure of the fuel lines do not vary, the controller 44 determines no leak is present in the fuel lines and continues to monitor (line 118) the gas turbine system for pressure changes within the fuel lines. If the difference between the commanded fuel flow and the predicted fuel flow varies (line 120) by more than acceptable threshold and the pressure change in the fuel line varies from the other fuel lines, the controller 44 determines a leak may be present in the fuel line. In response to a potential fuel leak, the controller 44 may apply (block 122) a fuel flow change compensation factor. The controller 44 may compare (block 124) the difference between commanded fuel flow to the predicted fuel flow after the fuel flow change compensation factor is applied. If the difference between the commanded fuel flow and the predicted fuel flow still varies (line 126) by more than acceptable threshold and the pressure in the fuel line from the other fuel lines, the controller 44 confirms a leak is confirmed in the fuel line. In the event that a leak is present, the controller 44 may generate (block 128) a notification of a presence of a leak in the fuel line. In some embodiments, data associated with the pressure change in the fuel lines may be used in leak detection calculations, thereby reducing false leak alarms.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various embodiments. An implementation of these modules and techniques may be stored on some form of computer-readable storage media.

The example system shown in FIGS. 1-2 are provided by way of example only. Numerous other operating environments, system architectures, and device configurations are possible. Accordingly, the embodiments of the present disclosure should not be construed as being limited to any particular operating environment, system architecture, or device configuration.

Technical effects of the claimed subject matter include detecting fuel leaks in a gas turbine engine system. The claimed subject matter includes a controller associated with the leak detection system which receives data from the sensors indicative of gas turbine cycle conditions, fuel temperature, fuel pressure, oxidant composition, and so forth. The controller calculates a pressure change in each fuel line and compares the pressure changes of each fuel line. If the calculated fuel flow due to a pressure measurement in a single fuel line does not deviate from its commanded fuel flow and exceeds the threshold, while the other fuel lines do not, the controller determines that a fuel leak may be present. If a fuel leak may be present, the controller applies a fuel flow change compensation factor (e.g., a multiplier factor) to the fuel lines. The controller then calculates the pressure change for each fuel line again. If the pressure change in the affected fuel line still varies from the other fuel lines and exceeds the threshold, the controller determines a leak is present and at least one correction action may be applied. If the pressure changes in all of the fuel lines by a similar amount, the controller determines that the pressure change in the fuel lines may be due to a change in fuel composition.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a combustor assembly configured to receive a fuel-oxidant mixture;
   a control valve configured to control a fuel flow into the combustor assembly;
   one or more sensors configured to measure one or more properties;
   a controller communicatively coupled to the one or more sensors and the control valve, wherein the controller is configured to:
   receive data from the one or more sensors indicative of operating conditions of the combustor assembly;
   determine a first predicted fuel flow for a first fuel line of a plurality of fuel lines based in part on the data received from the one or more sensors;
   calculate a first difference between a first commanded fuel flow and the first predicted fuel flow for the first fuel line, wherein the first difference corresponds to a first pressure measurement;
   calculate a second difference between a second commanded fuel flow and a second predicted fuel flow for a second fuel line of the plurality of fuel lines, wherein the second difference corresponds to a second pressure measurement;
   compare the first pressure measurement and the second pressure measurement to a pressure threshold; and adjust an operation of the control valve associated with a gas turbine engine when the first pressure measurement or second pressure measurement is greater than the pressure threshold.

2. The system of claim 1, wherein the controller is configured to adjust the operation of the control valve by using a multiplier factor to adjust a calculated fuel split of the plurality of fuel lines based in part on the data received from the one or more sensors.

3. The system of claim 1, wherein the one or more sensors comprises a fuel sensor configured to measure temperature or pressure of the fuel flow in the first fuel line.

4. The system of claim 1, wherein the one or more sensors are configured to measure one or more operating conditions of a gas turbine cycle.

5. The system of claim 1, wherein the one or more sensors are disposed upstream of the combustor assembly.

6. The system of claim 1, wherein the controller is configured to adjust operation of a gas turbine in fluid communication with the combustor assembly if the difference between the first commanded fuel flow and the first predicted fuel flow is greater than a threshold.

7. The system of claim 1, wherein the controller is configured to determine a property change of the fuel flow by comparing the first difference between the first commanded fuel flow and the first predicted fuel flow for the first fuel line to the second difference between the second commanded fuel flow and the second predicted fuel flow for the second fuel line.

8. The system of claim 7, wherein the controller is configured to generate a notification when a leak is detected based on the first pressure measurement or the second pressure measurement being greater than the pressure threshold.

9. The system of claim 1, wherein the plurality of fuel lines is configured to direct fuel to a corresponding fuel nozzle of the combustor assembly.

10. The system of claim 9, wherein the plurality of fuel lines is configured to receive fuel from a common header.

11. The system of claim 1, wherein the controller is configured to reduce erroneous leak notifications when a change in composition of the fuel flow occurs based on the first pressure measurement or the second pressure measurement being greater than the pressure threshold.

12. A method comprising:
receiving, via a controller, data from one or more sensors configured to measure one or more properties of a combustor fuel input from a plurality of fuel lines;
determining a first predicted fuel flow for a fuel based in part on the data received from the one or more sensors;
calculating a first difference between a first commanded fuel flow and the first predicted fuel flow, wherein the first difference corresponds to a first pressure measurement;
calculating a second difference between a second commanded fuel flow and a second predicted fuel flow for a second fuel line of the plurality of fuel lines, wherein the second difference corresponds to a second pressure measurement;
comparing the first pressure measurement and the second pressure measurement to a pressure threshold; and
adjusting operation of a gas turbine engine when the first pressure measurement or second pressure measurement is greater than the pressure threshold.

13. The method of claim 12, comprising comparing a first pressure difference of the first fuel line to a second pressure difference of the second fuel line to identify a property change of the fuel.

14. The method of claim 13, generating a notification when the property change of the fuel is identified.

15. The method of claim 12, wherein adjusting the operation of the gas turbine engine comprises using a multiplier to adjust the first commanded fuel flow based in part on signals received from the one or more sensors.

16. The method of claim 15, wherein the signals comprise fuel conditions or gas turbine operating conditions.

17. A tangible, non-transitory computer-readable media storing computer instructions thereon, the computer instructions, when executed by a processor, configured to cause the processor to:
receive data from one or more sensors configured to measure one or more properties of a combustor fuel input from a plurality of fuel lines;
determine a first predicted fuel flow of a fuel based in part on the data received from the one or more sensors;
calculate a first difference between a first commanded fuel flow and the first predicted fuel flow, wherein the first difference corresponds to a first pressure measurement;
calculate a second difference between a second commanded fuel flow and a second predicted fuel flow for a second fuel line of the plurality of fuel lines, wherein the second difference corresponds to a second pressure measurement;
compare the first pressure measurement and the second pressure measurement to a pressure threshold; and
adjust operation of a gas turbine engine when the first pressure measurement or second pressure measurement is greater than the pressure threshold.

18. The tangible, non-transitory computer-readable media of claim 17, wherein the computer instructions are configured to compare a first pressure difference in the first fuel line to a second pressure difference in the second fuel line to identify a property change of the fuel.

19. The tangible, non-transitory computer-readable media of claim 17, wherein the computer instructions are configured to generate a notification when the property change of the fuel is identified.

20. The tangible, non-transitory computer-readable media of claim 17, wherein the computer instructions are configured to adjust the operation of the gas turbine engine comprises using a multiplier to adjust the first commanded fuel flow based in part on signals received from the one or more sensors.

* * * * *